April 29, 1969     V. R. DU MOND ET AL     3,441,003
ANIMAL AND PET FOOD BOWL
Filed Sept. 29, 1966
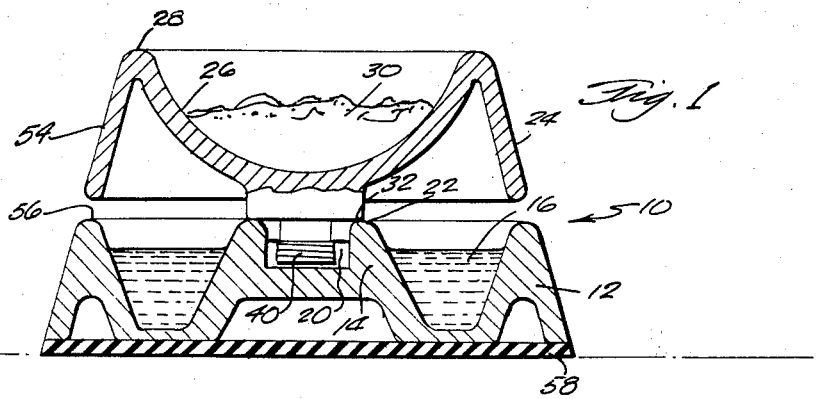
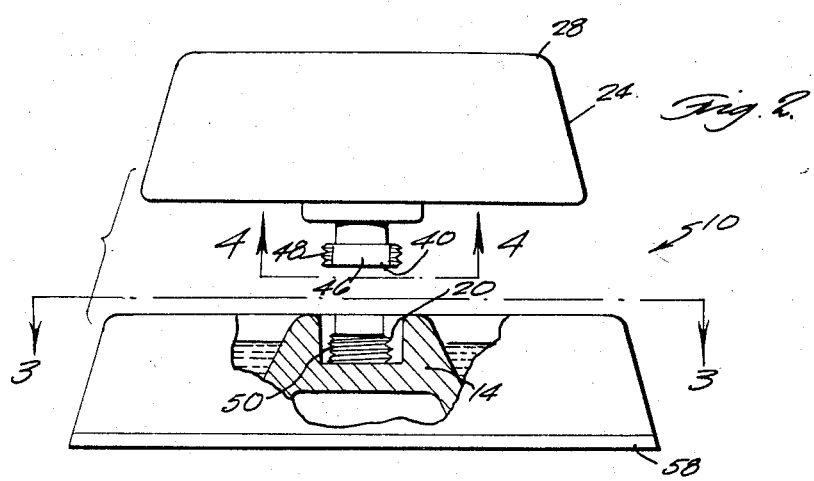
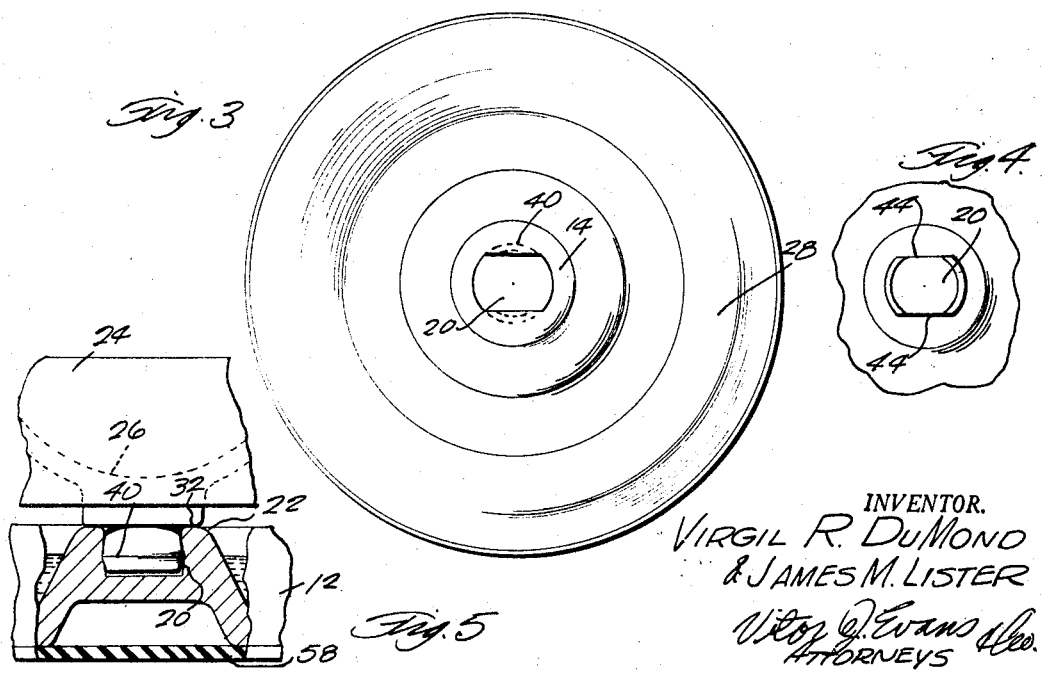
INVENTOR.
VIRGIL R. DuMOND
& JAMES M. LISTER
ATTORNEYS United States Patent Office 3,441,003
Patented Apr. 29, 1969

3,441,003
ANIMAL AND PET FOOD BOWL
Virgil R. Du Mond, 1138 Steves 78210, and James M. Lister, 243 La Clede 78214, both of San Antonio, Tex.
Filed Sept. 29, 1966, Ser. No. 583,023
Int. Cl. A01k 5/00; A01m 1/20
U.S. Cl. 119—61                   3 Claims

ABSTRACT OF THE DISCLOSURE

A bowl assembly having the lowermost bowl provided with rubber sheet base, a liquid containing portion for an insecticide being disposed therein, a central hub support means for supporting an upper feed bowl, and in which the peripheral portions of the feed bowl tangentially overhang the inner portions of the base bowl so that food does not collect in the liquid receiving portion of the base bowl.

---

The present invention is directed to a new and improved animal and pet food bowl for dogs, cats and similar animals, and more particularly the invention relates to a two-section, vertically arranged bowls which are coupled together wherein food is provided for the animal in the top bowl and insecticide or vermin-killing material is provided in the lower bowl recess. In this way, there is achieved a paramount object and advantage of the invention which is to provide a gap between the vertically arranged bowls so that insects and other vermin may obtain access into the vermin-killing substance of the lower bowl and thus do not obtain access to the upper bowl containing the food.

It is therefore an object of the invention to provide a bowl assembly in which the lowermost bowl is of sufficient construction to provide a holding and stationary pet food bowl and in which a rubber sheet material is provided on the lower side thereof to maintain the base bowl in place.

A further object of the invention is to provide an extension or outer lip to the upper feed bowl that extends peripherally to overhang beyond the outer portion of the lip of the base bowl so that food particles dropped on the outer lip of the feed bowl do not fall within the base bowl which would add to the vermin collection therein or provide means by which the vermin would ultimately obtain access to the feed bowl.

An additional object of the invention is to provide an animal and pet food bowl assembly in which the upper food bowl is coupled to the lower base bowl by a quick-connect-disconnect coupling so that a half turn or similar portion of a turn is sufficient to provide coupling and uncoupling of the bowl arrangement.

The above and other objects and advantages of the invention will become apparent upon full consideration of the following detailed description and accompanying drawings in which:

FIGURE 1 is a cross-sectional elevation view of the animal and pet food bowl assembly of the invention;

FIGURE 2 is a similar view in which only a portion thereof is shown in broken-away cross-section, and the component bowls are in generally exploded view;

FIGURE 3 shows a view taken along lines 3—3 of FIG. 2;

FIGURE 4 shows a view taken along lines 4—4 of FIG. 2; and

FIGURE 5 shows a broken-away and partially cross-sectional view of the manner in which the bowls are coupled together by the quick-connect-disconnect coupling of the preferred embodiment of the invention.

Referring now to the drawings, there is shown an animal and pet food bowl assembly 10 having a lower base bowl 12 having a generally annular recess about a central upwardly extending projection 14 in which the recess 16 may contain a liquid such as a vermin killing substance or material or a conventional type insecticide.

The central projection is centrally disposed upwardly of the central part of said base bowl, and there is provided at the upper portion of said central projection a quick-connect-disconnect coupling 20. Superimposed upon the base bowl and resting upon an upper lip or projecting portion 22 of the projection 14, there is supported a food bowl 24 having a generally central food receiving recess 26 terminated by an edge 28, and in which it is adapted to receive pet food shown generally as material 30.

On the underside of the food bowl 24, there is an engaging shoulder 32 that meets and rests upon the edge 22, and in which there is in mating relation a quick-connect-disconnect coupling 40 for engaging the coupling 20. As is evident from FIGS. 2, 3 and 4, the coupling may be inserted so that the side portions 44 engage side portions 46 of coupling 40 so that the bowls are quickly connected into engaging relationship, and by means of the threaded portions 48, 50, by a simple half turn, the components of the coupling may be engaged into fast and tight arrangement when the shoulder 32 rests upon the upper edge 22 of the base bowl 12.

The food bowl 24 is used to retain food within said bowl, and the quick-connect-disconnect mating coupling 20, 40 provides the bowl arrangement so that the base bowl 12 may be quickly and easily securely engaged to the food bowl 24.

The outer lip 54 of the food bowl 24 extends peripherally of the upper edge 28 beyond and outwardly of the outer portion or upper edge 56 so that food particles that may be dropped upon the outer lip 54 do not fall within the base bowl recess 16, which would cause added advantage for insects to crawl across the liquid therein for obtaining access to the food bowl 24.

There is provided a rubber base plate 58 under the base bowl 12 which secures the base bowl in place to prevent sliding of the bowl arrangement.

The bowl arrangement 12, 24 may be made of any plastic or other formable material, and the size thereof can be made in accordance with desired arrangements.

What is claimed is:

1. An animal and pet food bowl comprising a base bowl having upwardly and inwardly extending side walls with a central reservoir therein for containing a liquid such as a vermin killing substance or insecticide, a support means centrally disposed upwardly of said central reservoir of said base bowl, a quick, connect-disconnect coupling at an upper portion of said projection having upwardly and inwardly extending side walls and a food bowl having a central recess to retain food within said bowl, and said upwardly and inwardly extending side walls of the base bowl and of the food bowl being contiguous with each other and thereby constituting means to shield the lower base bowl from the upper food bowl, and being sufficiently spaced apart from each other, and a quick, connect-disconnect mating coupling centrally mounted beneath said feed bowl to removably engage the coupling of said projection.

2. The invention according to claim 1 wherein said quick, connect-disconnect mating coupling is a half-turn screw means.

3. The invention according to claim 1 wherein a rubber base plate is secured under the base bowl to provide non-skid and non-sliding properties.

References Cited

UNITED STATES PATENTS

| | | | |
|---|---|---|---|
| 52,576 | 2/1866 | Lamb | 43—121 |
| 713,803 | 11/1902 | Rothweiler | 43—121 |
| 1,887,771 | 11/1932 | Marsh | 43—121 X |
| 1,960,464 | 5/1934 | Thalheimer | 43—131 |
| 2,356,022 | 8/1944 | Wright | 43—121 X |
| 2,784,520 | 3/1957 | Johnson | 43—121 |
| 3,195,510 | 7/1965 | Bernstein | 119—61 |
| 3,202,131 | 8/1965 | Jones | 119—61 |

ALDRICH F. MEDBERY, *Primary Examiner.*

U.S. Cl. X.R.

43—121